United States Patent
Ido et al.

(10) Patent No.: US 6,810,189 B2
(45) Date of Patent: Oct. 26, 2004

(54) OPTICAL WAVEGUIDE AND METHOD FOR PREPARING THE SAME

(75) Inventors: Tatemi Ido, Kokubunji (JP); Takamitsu Nagara, Kokubunji (JP); Tadahiro Kimura, Hitachi (JP); Tooru Takahashi, Tsukuba (JP)

(73) Assignees: Hitachi, Ltd., Tokyo (JP); Hitachi ULSI Systems, Co., Ltd., Tokyo (JP); Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/120,185

(22) Filed: Apr. 11, 2002

(65) Prior Publication Data

US 2003/0194192 A1 Oct. 16, 2003

(51) Int. Cl.$^7$ .............................. G02B 6/10; G02B 6/12
(52) U.S. Cl. ......................... 385/129; 385/130; 385/14
(58) Field of Search .............................. 385/14, 88–94, 385/129–132

(56) References Cited

U.S. PATENT DOCUMENTS

| | | | |
|---|---|---|---|
| 6,112,002 A | * | 8/2000 | Tabuchi ........................ 385/50 |
| 2002/0076161 A1 | * | 6/2002 | Hirabayashi et al. ......... 385/40 |
| 2003/0053736 A1 | * | 3/2003 | Kuhara ........................ 385/14 |
| 2004/0076359 A1 | * | 4/2004 | Takahashi et al. ............ 385/14 |

FOREIGN PATENT DOCUMENTS

| | | | |
|---|---|---|---|
| JP | 7-174930 A | 7/1995 | ............ G02B/6/13 |
| WO | WO 98/37455 | 8/1998 | ........... G03B/21/20 |

OTHER PUBLICATIONS

The Technical Report ofThe Proceeding of the Institute of Electric Information and Communication Engineers, 99–24, pp. 7–12 (Aug., 1999).

* cited by examiner

*Primary Examiner*—Brian Healy
*Assistant Examiner*—Kevin S. Wood
(74) *Attorney, Agent, or Firm*—Griffin & Szipl, P.C.

(57) ABSTRACT

A polymeric optical waveguide substrate includes a first region provided thereon with a polymer optical waveguide and an optical waveguide-free second region, the first and second regions being on the same substrate, wherein an adhesive layer is between the lowermost polymer layer constituting the optical waveguide in the first region and the substrate, and wherein a groove intrudes into the substrate at the boundary between the first and second regions. A method for preparing the waveguide substrate includes the steps of applying an adhesive layer onto the first region while the second region is free of any adhesive layer; applying a polymer onto the whole surface of the substrate to give a polymer layer for forming an optical waveguide following the formation of the adhesive layer; cutting the polymer layer at the boundary between the first and second regions; and peeling off or removing the polymer on the second region.

18 Claims, 3 Drawing Sheets

OPTICAL WAVEGUIDE AND METHOD FOR PREPARING THE SAME

BACKGROUND OF THE INVENTION

The present invention relates to a polymeric optical waveguide substrate used, in particular, in an optical module used for optical communication as well as a method for the preparation of such a polymeric optical waveguide substrate.

There have recently been investigated various optical parts, which make use of an optical waveguide of quartz for the purpose of making optical parts used for optical communication highly functional, of reducing the size thereof and of saving the production cost and there have been known, for instance, an optical splitter and an arrayed-waveguide grating multiplexer/demultiplexer, which have already been put on the market. Moreover, a small and low cost transceiver module has already been realized by hybrid-packaging semiconductor elements such as a laser diode or a photodiode on a quartz optical waveguide substrate. On the other hand, there have been investigated a variety of polymers as materials for constructing waveguides in addition to quartz. A polymeric waveguide may be formed by the spin coating method and therefore, a waveguide substrate can be prepared in a high production efficiency and at a low cost, as compared with the quartz waveguide. For this reason, an optical module may be realized at a low cost, by the hybrid-packaging technique in which semiconductor elements are mounted on a polymeric waveguide substrate. An example of a polymeric waveguide substrate provided thereon with a semiconductor element such as a laser diode or a photodiode is disclosed in, for instance, The Technical Report of The Proceeding of The Institute of Electronics Information and Communication Engineers, 99–24, pp. 7–12 (August, 1999).

In the article, a polymeric optical waveguide substrate and an optical module are prepared according to the following preparation process: (1) Electrodes are formed on a silicon substrate provided thereon with an oxide layer and a polymeric waveguide is then applied onto the substrate by the spin coating method; (2) the polymeric waveguide on the region of the substrate in which elements are formed is completely removed by the dry etching technique using oxygen gas to thus expose the electrodes; and (3) a laser diode and/or a photodiode are mounted on the electrodes using a solder.

However, the following problems arise in the removal of the polymer layer by the dry etching step (2) in the foregoing preparation process. First of all, the polymer layer to be removed is quite thick on the order of 20 to 30 $\mu$m, this step accordingly requires a very long etching time of not less than one hour and therefore, this method is insufficient in mass production ability and cost-saving. Moreover, not only the mask used in the dry etching step should have a high selectivity ratio, but also the polymer layer should be removed by a technique, which never adversely affects the electrodes, the oxide layer and the polymer layer exposed after the etching step. This makes the selection of materials for such a mask very difficult. In addition, if the polymer layer is highly etched to such a high depth, the etched surface is roughened because of the presence of, for instance, foreign body derived from the sputtered mask and/or the chamber, the foreign body remain on the exposed electrodes or unevenness is formed thereon and this may interfere with the welding of semiconductor elements to the electrodes through soldering.

SUMMARY OF THE INVENTION

Accordingly, it is an object of the present invention to provide a novel polymeric optical waveguide substrate, which permits the solution of the foregoing problems associated with the conventional techniques.

It is another object of the present invention to provide a method for the preparation of such a polymeric optical waveguide substrate.

The inventors of this invention have conducted various studies to solve the foregoing problems, and have found that the foregoing object of the present invention can be accomplished by a method comprising the steps of (1) forming an electrode on the region of a substrate on which a semiconductor element is to be mounted, (2) applying an adhesive layer capable of improving the adhesion between a polymer layer for a polymeric optical waveguide and the substrate only onto the region of the substrate on which the polymeric waveguide is to be formed, (3) forming the polymer layer for a polymeric waveguide on the whole surface of the substrate, (4) cutting the polymer layer at the boundary between the element mounting region and the waveguide region and (5) removing the polymer layer on the element mounting region to expose the electrode. They have thus completed the present invention.

According to an aspect of the present invention, there is provided a polymeric optical waveguide substrate, which comprises a first region provided thereon with an optical waveguide of a polymer layer and a second region free of any optical waveguide, the first and second regions being present on the same substrate, wherein it comprises an adhesive layer between the lowermost polymer layer constituting the optical waveguide in the first region and the substrate, for improving the adhesion or adhesive properties of them and wherein it has a groove intruding into the substrate at the boundary between the first and second regions.

According to another aspect of the present invention, there is provided a method for the preparation of a polymeric optical waveguide substrate, which comprises a first region provided thereon with an optical waveguide of a polymer layer and a second region free of any optical waveguide, the first and second regions being present on the same substrate, wherein the method comprises the steps of applying an adhesive layer onto the first region for the improvement of the adhesion or adhesive properties of the substrate and the polymer layer for forming an optical waveguide on the surface of the substrate, while the second region is free of any adhesive layer; applying a polymer onto the whole surface of the substrate to give the polymer layer for forming an optical waveguide, after the formation of the adhesive layer on the first region; cutting the polymer layer at the boundary between the first and second regions; and then peeling off or removing the polymer layer on the second region.

In preferred embodiments of the polymeric optical waveguide substrate according to the present invention, it has electrodes on the second region for mounting semiconductor elements; the substrate is a member selected from the group consisting of a silicon substrate, a silicon substrate provided thereon with a silicon oxide layer, a glass substrate and a ceramic substrate; the lowermost layer of the polymer layer constituting the optical waveguide comprises a fluorine-containing polymer and more preferably a fluorinated polyimide and this makes, easy, the removal of the polymer layer on the region on which semiconductor elements are to be mounted; the polymer layer constituting the optical waveguide is formed from a fluorinated polyimide; and the adhesive layer comprises at least one member selected from the group consisting of polyimide-silicone resins, fluorine-free polyimide resins, organic aluminum compounds, organic zirconium compounds and organic titanium compounds.

In preferred embodiments of the method for the preparation of the foregoing polymeric optical waveguide substrate according to the present invention, the electrode is formed on the substrate prior to the formation of the adhesive layer; a dicing device is used for the cutting of the polymer layer and the bottom of the groove thus formed intrudes into the substrate; the substrate is a member selected from the group consisting of a silicon substrate, a silicon substrate provided thereon with a silicon oxide layer, a glass substrate and a ceramic substrate; the lowermost layer of the polymer layer constituting the optical waveguide comprises a fluorine-containing polymer and more preferably a fluorinated polyimide and this makes, easy, the removal of the polymer layer on the region on which semiconductor elements are to be mounted; the polymer layer constituting the optical waveguide is formed from a fluorinated polyimide; and the adhesive layer comprises at least one member selected from the group consisting of polyimide-silicone resins, fluorine-free polyimide resins, organic aluminum compounds, organic zirconium compounds and organic titanium compounds.

BRIEF DESCRIPTION OF THE DRAWINGS

The present invention will be described in more detail with reference to the accompanying drawings.

DESCRIPTION OF THE PREFERRED EMBODIMENTS

The present invention will hereunder be described in more detail.

In general, a polymer material is insufficient in the adhesion to, for instance, silicon and silicon oxide. For this reason, when a polymeric optical waveguide is formed on an inorganic substrate, a certain adhesive layer is formed between the waveguide and the substrate. In particular, fluorine-containing polymers (such as fluorinated polyimides) are quite inferior in the adhesion to the substrate and accordingly, there has been investigated, in particular, an adhesive layer for solving the problem of the insufficient adhesion of the polymer layer to the inorganic substrate. Japanese Un-Examined Patent Publication No. Hei 7-174930 discloses the use of organic zirconium compounds as materials for the adhesive layer and WO 98/37455 likewise discloses the use of fluorine-free polyimides and polyimide-silicone resins and these patents also disclose that these materials for the adhesive layer permit the achievement of practically satisfied adhesive strength. The inventors of this invention have taken note of the fact that the adhesive strength of the polymer (in particular, fluorine-containing polymers) to an inorganic substrate can be controlled by the use of such an adhesive layer.

Figure 1:
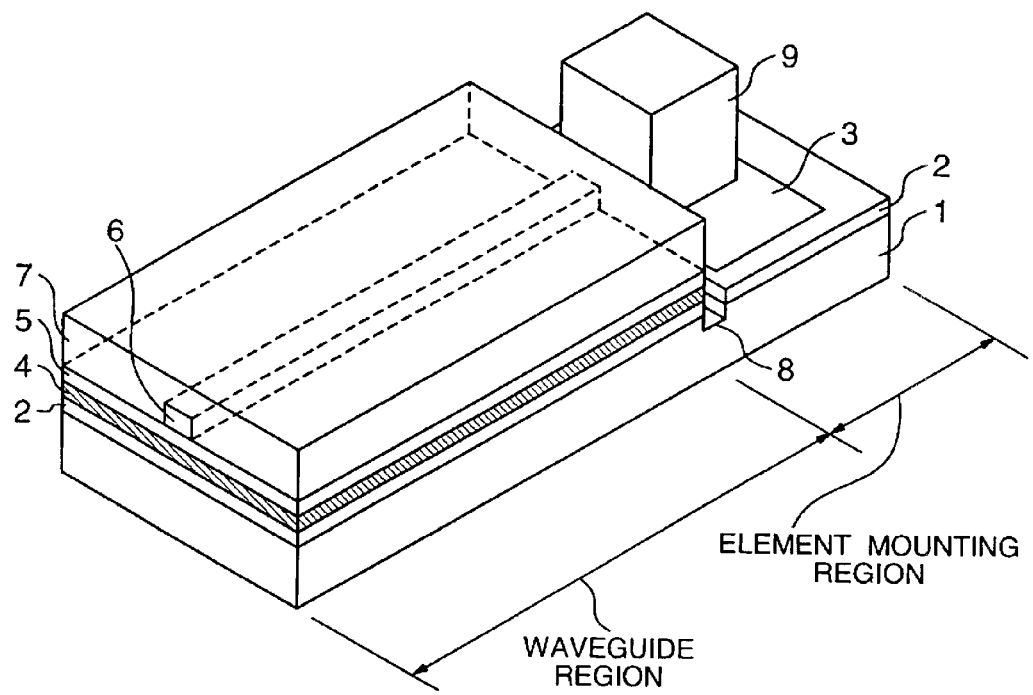
FIG. 1 is a perspective view showing an optical module, which makes use of a polymeric optical waveguide substrate according to the present invention.
Figure 2A:
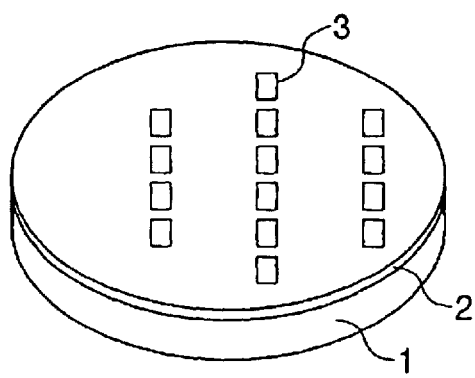
FIGS. 2A to 2F explain the method for preparing a polymeric optical waveguide substrate according to the present invention.
Figure 2D:
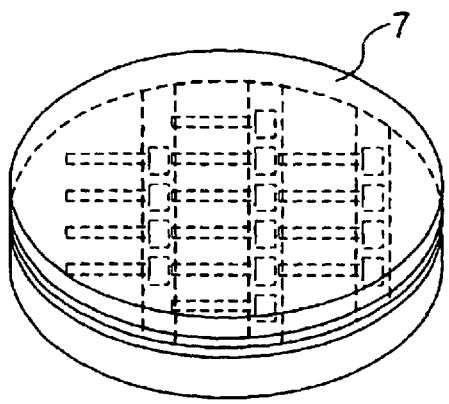
Figure 2B:
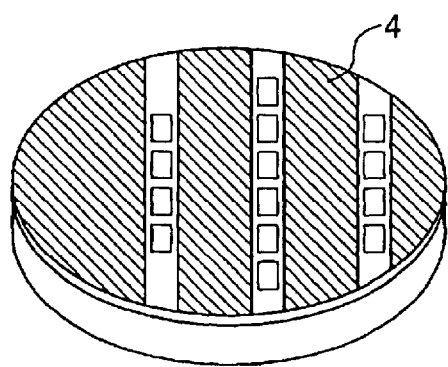
Figure 2E:
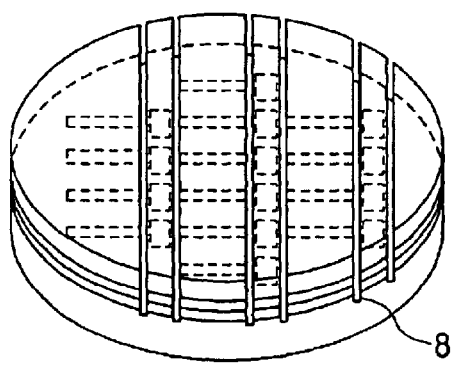
Figure 2C:
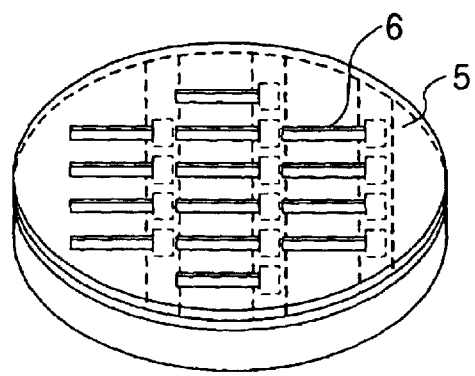
Figure 2F:
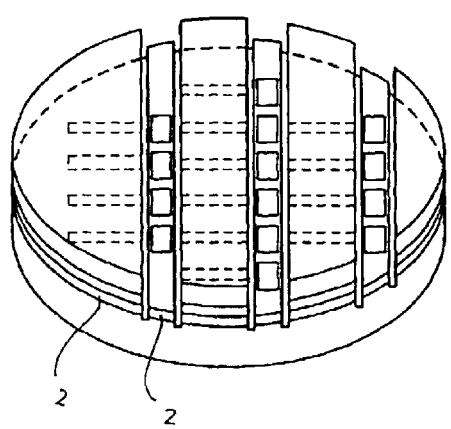

Referring first to FIG. 1, there is depicted an optical module comprising a polymeric optical waveguide substrate of the present invention, which is provided with a semiconductor element. FIG. 2 is a flow diagram for explaining a process for preparing the polymeric optical waveguide substrate used in the optical module shown in FIG. 1, in particular, the wafer process. The polymeric optical waveguide substrate is prepared according to the following preparation process. Electrodes 3 on which a semiconductor element is to be mounted are formed on a silicon substrate 1 provided thereon with a silicon oxide layer 2 (FIG. 2A). Then an adhesive layer 4 is formed only on the region of the substrate on which a polymeric optical waveguide is to be formed later to thus improve the adhesive properties of the lower cladding layer of the polymeric optical waveguide to the substrate (or the adhesive layer 4 is formed on the region other than that for mounting a semiconductor element) (FIG. 2B). Varnishes are in order applied onto the whole surface of the substrate, followed by baking the varnish layers to thus form a lower cladding layer 5 and a core layer 6 consisting of a polymer, respectively and then processing the core layer 6 by, for instance, the etching technique to give a patterned optical waveguide (FIG. 2C). Varnish is again applied onto the substrate provided thereon with the patterned waveguide and then baked to form an upper cladding layer 7 (FIG. 2D). Grooves 8 are formed at the boundary between the waveguide region and the semiconductor element mounting region using a dicing device or the polymer layer (the lower cladding layer 5, the core layer 6, and the upper cladding layer 7) is cut at the boundary by the device (FIG. 2E). Any adhesive layer is not present in the semiconductor element mounting region and accordingly, the polymer layer present thereon can easily be removed to thus expose the electrodes and the oxide layer (FIG. 2F).

In this stage, if a fluorine-containing optical polymer is used for forming, in particular, the lower cladding layer 5, the layer can particularly easily be removed from the substrate. On the other hand, the waveguide region is provided with the adhesive layer and therefore, the polymer layer is never peeled off from the substrate and would maintain practically satisfied adhesive strength over a long period of time. Thereafter the wafer is cut or divided into chips to thus complete the desired polymeric optical waveguide substrates. Then a semiconductor optical element 9 is fixed to the electrodes 3 or the semiconductor element mounting region on the resulting waveguide substrate using a gold-tin solder or the like, while aligning the element and the polymer waveguide in such a manner that the optical coupling between them is ensured. An optical fiber is adhered to the edge of the waveguide to thus complete an optical module. Examples of such adhesive layers are those of organic metal compounds obtained by applying solutions containing chelates or esters of, for instance, zirconium, aluminum or titanium and then baking the resulting layers; those of fluorine-free polymers such as polyimides; those of polymers containing silicon such as polyimide-silicon whose adhesive properties are improved; or multilayered films of any combination thereof.

In the step for cutting the polymer layer at the boundary by dicing, the particle size of diamond and bonding agents used in a grindstone are appropriately selected to reduce the unevenness of the edge of the waveguide to a sufficiently low level (<0.2 $\mu$m) and therefore, a semiconductor element may be optically coupled with the waveguide while reducing the scattering loss at the boundary thereof to a level as low as possible. In addition, the cutting of the polymer layer at the boundary may likewise be carried out using a cutter in addition to the dicing technique. Moreover, only the boundary region may be removed by the dry etching. In this case, problems arise such that the selection of materials for masks is very difficult and that this process requires a long processing time. However, the polymer layer present on the electrodes is not removed by etching unlike the conventional method and therefore, the dry etching never suffers from any problem such as the adhesion of foreign body to the electrodes and the generation of unevenness of the electrode surface, which may interfere with the mounting of semiconductor elements. Moreover, when using the dicing, the boundary between the waveguide region and the semiconductor element mounting region should be positioned on a straight line on the wafer, but a desired waveguide substrate can be prepared even if the boundary has a curvature or it is interrupted when a cutter or dry etching technique is selected.

The present invention will hereunder be described in more detail with reference to the following Examples, but the present invention is not restricted to these specific Examples at all.

A specific method for preparing a module for optical transmission according to the present invention (FIG. 1) will specifically be described below. Ti/Au electrodes 3 are formed on a silicon substrate 1 provided thereon with a thermally oxidized layer 2 (thickness: 1 $\mu$m). A varnish is applied onto the whole surface of the substrate and then baked to form an adhesive layer 4 (thickness: 0.5 $\mu$m) of a polyimide-silicon resin. Then the adhesive layer present on the semiconductor element mounting region is removed by the reactive ion etching (RE) technique using oxygen gas. Two kinds of fluorinated polyimide varnishes are in order applied onto the substrate and then baked to form a lower cladding layer 5 (thickness: 5 $\mu$m) and a core layer 6 (thickness: 6 $\mu$m), respectively. Subsequently, the unnecessary region of the core layer is removed by the RIE technique to thus process the core layer into a waveguide shape (width: 6 $\mu$m). A fluorinated polyimide varnish is again applied onto the substrate and then baked to give an upper cladding layer 7 (thickness: 15 $\mu$m). At this stage, the fluorinated polyimide material is selected in such a manner that the difference in the refractive index between the cladding layer and the core layer is 0.6%. Then grooves are formed at the boundary between the waveguide region and the semiconductor element mounting region even to the middle of the silicon substrate using a dicing device. In this respect, the width of the grindstone used for the dicing is 20 $\mu$m and the depth of the grooves intruding into the silicon substrate is equal to about 100 $\mu$m. The fluorinated polyimide has quite low adhesion to the substrate and the tensile stress remaining in the layer is very high. Therefore, the polymer layer on the semiconductor element mounting region free of any adhesive layer is spontaneously peeled off from the silicon oxide layer and the electrodes immediately after the dicing step and clear electrodes and silicon oxide layer are thus exposed.

On the other hand, the polymeric optical waveguide on the waveguide region provided with the adhesive layer is firmly adhered to the substrate and never undergoes any peeling. Then a laser diode 9 and the optical waveguide are aligned in such a manner that they are optically coupled in a high efficiency and the laser 9 is connected to the electrode 3 using an AuSn solder. Moreover, an optical fiber is center-aligned and fixed to the opposite edge of the optical waveguide through adhesion. At this stage, when an electric current of 20 mA was passed through the laser diode, an optical output of 0.5 mW was observed at the end of the optical fiber.

In the foregoing, a polyimide-silicon resin is used as a specific example of the material for the adhesive layer, but almost the same effect can be obtained when using, as such materials for the adhesive layer, other organometal compounds such as organic aluminum compounds, organic titanium compounds and organic zirconium compounds obtained by applying chelates or esters containing metals such as aluminum, titanium and zirconium to the substrate and then baking the resulting layer. In such cases, these adhesive layers may be removed by the wet etching technique using, for instance, an aqueous hydrofluoric acid solution as an etchant. In the present invention, it is also possible to use, as the adhesive layer, a bi-layer film formed by, for instance, applying a layer of a polyimide-silicon resin or a fluorine-free polyimide resin after the formation of the layer of the organometal compound.

Figure 3:
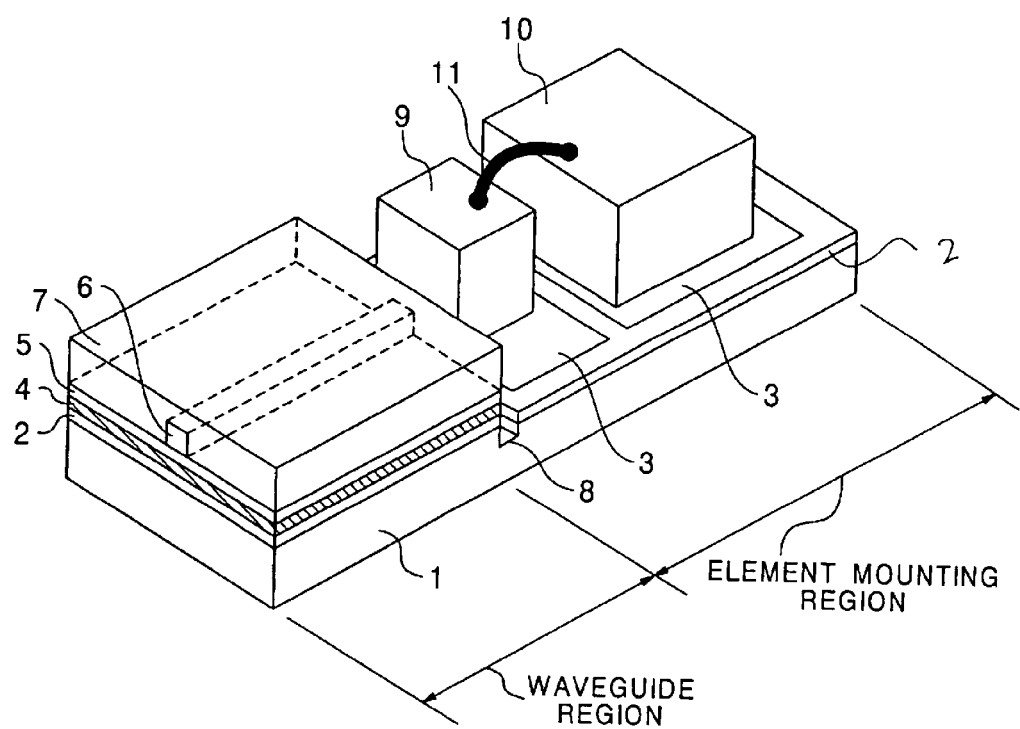
FIG. 3 is a perspective view showing an optical module, which makes use of another polymeric optical waveguide substrate according to the present invention.

A specific method for preparing a module for optical transmission according to the present invention (FIG. 3) will specifically be described below. Ti/Au electrodes 3 are formed on a silicon substrate 1 provided thereon with a thermally oxidized silicon layer 2 (thickness: 2 $\mu$m). Then a solution of an aluminum-containing chelate is applied onto the substrate and then the resulting layer is baked to give a layer of an organic aluminum compound (thickness: 200 Å). Moreover, a varnish of a fluorine-free polyimide is applied onto the layer of the organic aluminum compound and then the layer is baked to form an adhesive layer 4 (thickness: 0.5 $\mu$m) comprising the organic metal oxide and the polyimide. Thereafter, the adhesive layer present on the semiconductor element mounting region is removed by the RIE technique using oxygen and a fluorine-containing gas. Two kinds of fluorinated polyimide varnishes are in order applied onto the substrate and then baked to form a lower cladding layer 5 (thickness: 5 $\mu$m) and a core layer 6 (thickness: 6 $\mu$m), respectively. Subsequently, the unnecessary region of the core layer 6 is removed by the RIE technique to thus process the core layer into a waveguide shape having a width of 6 $\mu$m. The fluorinated polyimide varnish is again applied onto the substrate and then baked to give an upper cladding layer 7 (thickness: 15 $\mu$m). At this stage, the fluorinated polyimide material is selected in such a manner that the difference in the refractive index between the cladding layer and the core layer is equal to 0.6%. Then grooves are formed at the boundary between the waveguide region and the semiconductor element mounting region by cutting the substrate even to the middle of the silicon substrate using a dicing saw. In this respect, the width of the grindstone used for the dicing is 40 $\mu$m and the depth of the grooves intruding into the silicon substrate is equal to about 100 $\mu$m. The fluorinated polyimide has quite low adhesion to the substrate and the tensile stress remaining in the layer is very high. Therefore, the polymer layer on the semiconductor element mounting region free of any adhesive layer is spontaneously peeled off from the silicon oxide layer and the electrodes immediately after the dicing step and clear electrodes and silicon oxide layer are thus appeared.

On the other hand, the polymeric optical waveguide on the waveguide region provided with the adhesive layer is firmly adhered to the substrate and never undergoes any peeling. Then a waveguide-type photodiode 9 and a preamplifier IC 10 are mounted on the corresponding electrodes and they are connected by the wire bonding technique. An optical fiber is adhered to the opposite end of the waveguide and the resulting assembly is accommodated in a package. The optical module thus produced has a receiving sensitivity as determined at 150 Mbit/s of −36 dBm and can normally be operated. As has been described above, the semiconductor element to be mounted on the semiconductor element mounting region may be a semiconductor integrated circuit (IC) in addition to the optical elements. In this Example, a bi-layer combination comprising a layer of an organic aluminum compound obtained by baking an aluminum-containing chelate layer and a fluorine-free polyimide layer has particularly been described as the adhesive layer, but it is also possible to use, as such adhesive layer, those prepared from other organometal compounds such as organic titanium compounds and organic zirconium compounds.

In addition, polymeric optical waveguide substrates provided with simple linear waveguides have particularly been described in the foregoing two Examples, but the present invention likewise permits the preparation of polymeric optical waveguide substrates provided with waveguides other than the linear ones such as Y-shaped branching waveguides, splitters, directional couplers and wavelength division multiplexer/demultiplexers. In addition, the semiconductor element to be mounted may be a laser diode, a photodiode, a semiconductor optical amplifier, an optical modulator or any combination thereof to thus form various kinds of modules having a variety of functions such as transceiver modules, wavelength division multiplex transmitting modules, wavelength division multiplex receiving modules and optical switches. Regarding the substrate, a silicon substrate provided thereon with a silicon oxide layer has been described as a specific example, but it is a matter of course that the present invention can be practiced using any substrate having a surface layer of an inorganic material inferior in the adhesion to an organic film, such as an oxide layer-free silicon substrate, a glass substrate or a ceramic substrate. Furthermore, a polymeric optical waveguide having an embedded structure has particularly been described in the foregoing Examples, but the waveguide may have a variety of structures such as ridge-shaped ones and other structures.

As has been described above in detail, the present invention permits the production of a polymeric optical waveguide substrate excellent in the mass production ability and in turn permits the further reduction of the production cost of optical modules.

What is claimed is:

1. A polymeric optical waveguide substrate comprising:
a first substrate;
a first region, provided the first substrate, with a polymeric optical waveguide having multiple layers;
a second region free of any optical waveguide, the first and second regions being present on the first substrate; and
an adhesive layer provided between a lowermost polymer layer of the polymeric optical waveguide in the first region and the first substrate, wherein the polymeric optical waveguide substrate has a groove intruding into the first substrate at the boundary between the first and second regions.

2. The polymeric optical waveguide substrate of claim 1, wherein the polymeric optical waveguide substrate has an electrode on the second region for mounting a semiconductor element.

3. The polymeric optical waveguide substrate of claim 1, wherein the first substrate is a member selected from the group consisting of a silicon substrate, a silicon substrate provided thereon with a silicon oxide layer, a glass substrate and a ceramic substrate.

4. The polymeric optical waveguide substrate of claim 1, wherein the lowermost layer of the polymer optical waveguide comprises a fluorine-containing polymer.

5. The polymeric optical waveguide substrate of claim 4, wherein the lowermost layer of the polymer optical waveguide comprises a fluorinated polyimide.

6. The polymeric optical waveguide substrate as set forth in claim 1 wherein the adhesive layer comprises at least one member selected from the group consisting of polyimide-silicon resins, fluorine-free polyimide resins, organic aluminum compounds, organic zirconium compounds and organic titanium compounds.

7. A method for the preparation of a polymeric optical waveguide substrate, which comprises a first region provided thereon with an optical waveguide of a polymer and a second region free of any optical waveguide, the first and second regions being present on the same substrate, wherein the method comprises the steps of applying an adhesive layer onto the first region for the improvement of the adhesion or adhesive properties of the substrate and the polymer layer for forming an optical waveguide on the surface of the substrate, while the second region is free of any adhesive layer; applying a polymer onto the whole surface of the substrate to give a polymer layer for forming an optical waveguide, after the formation of the adhesive layer on the first region; cutting the polymer layer at the boundary between the first and second regions; and then peeling off or removing the polymer on the second region.

8. The method for preparing a polymeric optical waveguide substrate of claim 7, wherein the waveguide substrate comprises an electrode for mounting a semiconductor element on the second region and wherein the method comprises the step of forming the electrode on the substrate prior to the formation of the adhesive layer.

9. The method for preparing a polymeric optical waveguide substrate of claim 7, wherein a dicing device is used for cutting the polymer layer and the bottom of the grooves formed by the dicing device intrudes into the substrate.

10. The method for preparing a polymeric optical waveguide substrate as set forth in claim 7, wherein the substrate is a member selected from the group consisting of a silicon substrate, a silicon substrate provided thereon with a silicon oxide layer, a glass substrate and a ceramic substrate.

11. The method for preparing a polymeric optical waveguide substrate as set forth in claim 7, wherein the lowermost layer of the polymer layer constituting the waveguide comprises a fluorine-containing polymer.

12. The method for preparing a polymeric optical waveguide substrate as set forth in claim 7, wherein the polymer layer constituting the waveguide comprises a fluorinated polyimide.

13. The method for preparing a polymeric optical waveguide substrate of claim 11, wherein the lowermost layer of the polymer layer constituting the waveguide comprises a fluorinated polyimide.

14. The method for preparing a polymeric optical waveguide substrate as set forth in claim 7, wherein the adhesive layer comprises at least one member selected from the group consisting of polyimide-silicon resins, fluorine-free polyimide resins, organic aluminum compounds, organic zirconium compounds and organic titanium compounds.

15. The polymeric optical waveguide substrate as set forth in claim 2 wherein the adhesive layer comprises at least one member selected from the group consisting of polyimide-silicon resins, fluorine-free polyimide resins, organic aluminum compounds, organic zirconium compounds and organic titanium compounds.

16. The polymeric optical waveguide substrate as set forth in claim 3 wherein the adhesive layer comprises at least one member selected from the group consisting of polyimide-silicon resins, fluorine-free polyimide resins, organic aluminum compounds, organic zirconium compounds and organic titanium compounds.

17. The polymeric optical waveguide substrate as set forth in claim 4 wherein the adhesive layer comprises at least one member selected from the group consisting of polyimide-silicon resins, fluorine-free polyimide resins, organic aluminum compounds, organic zirconium compounds and organic titanium compounds.

18. The polymeric optical waveguide substrate as set forth in claim 5 wherein the adhesive layer comprises at least one member selected from the group consisting of polyimide-silicon resins, fluorine-free polyimide resins, organic aluminum compounds, organic zirconium compounds and organic titanium compounds.

* * * * *